United States Patent [19]
Peleg

[11] Patent Number: 5,028,161
[45] Date of Patent: Jul. 2, 1991

[54] STRUCTURAL DISMANTABLE JOINT ASSSEMBLY

[76] Inventor: Alex Peleg, Moshav Bitzaron near Gedera, Israel

[21] Appl. No.: 546,816

[22] Filed: Jul. 2, 1990

[51] Int. Cl.$^5$ .............................................. F16D 1/00
[52] U.S. Cl. ..................................... 403/24; 403/236; 403/191
[58] Field of Search ............... 403/234, 235, 236, 191, 403/233, 190, 24

[56] References Cited

U.S. PATENT DOCUMENTS 1,822,389  9/1931  Blakely ........................... 403/235 X
2,764,438  9/1956  Haviland .............................. 403/234

Primary Examiner—Andrew V. Kundrat
Attorney, Agent, or Firm—Browdy and Neimark

[57] ABSTRACT

The invention provides a structural dismantable joint assembly for joining a first to a second structural framework member, comprising a band clamp sized to embrace the first structural member and provided with a pair of alignable spaced-apart apertures near the ends thereof, the second framework member, being of hollow cross-section and having at least one end provided with two opposing holes, the ends of the band clamp being insertable into the second framework member between the holes, the apertures being in alignment with the holes, and a tightenable bolt unit configured for insertion through the opposing holes and the apertures, whereby on tightening of the bolt unit the ends of the band clamp are brought more closely together as result of pressure being applied by the opposing walls of the second framework member, the assembly being thereby fastened to hold the two framework members in selectable angled relationship to each other.

8 Claims, 3 Drawing Sheets

STRUCTURAL DISMANTABLE JOINT ASSSEMBLY

The present invention relates to a structural dismantable joint. More particularly it is concerned with providing a high-efficiency low-cost non-welded joint for the construction of rigid tubular frameworks.

Tubular frameworks are in common use for a variety of purposes, such as building scaffolding and hothouse frames, the tubes usually being made of steel. The advantages of the tube over other forms are in it being the best possible form to resist torsion, having good resistance of bending and additionally having its inner surface protected from corrosion. Most tubular frameworks require many joints, a common form being the welded joint, which provides good strength and rigidity. However, there are many situations where welded joints cannot be used, such as if a need is foreseen to alter or dismantle the framework, if welding equipment is unavailable or if the tubes are aluminium and specialized welding equipment is unavailable or if construction is to be carried out under water or in a location where inflammable gases or materials are present. Accordingly many types of non-welded joints have been developed, a major requirement for these being high joint efficiency. Joint efficiency may be defined as the strength of the joint divided by the strength of the tube, the result usually being expressed as a percentage, while the strength referred to may be torsion, bending or shear. A high joint efficiency is economically important, because attaining a given framework strength with high-efficiency joints enables the use of smaller tubing than if low-efficiency joints are used. One inexpensive and common form of joint is effected by completely flattening the extremity of the tube, drilling a hole in the flattened area and attaching this tube to a second tube by means of a band clamp, a screw and nut. The disadvantage of this joint is the severe loss of rigidity in bending and torsion of the flattened end, resulting in very low joint efficiency, while the low cost of manufacturing such a joint is insufficient compensation for the ensuing need to use tubes of large diameter or wall thickness in order to retain the required strength.

It is one of the objects of the present invention to provide a joint having a high joint efficiency and yet being capable of manufacture at low cost. It is a further object of the present invention to provide means for rigidizing roof structures of a type often used for greenhouses.

This the present invention achieves by providing a structural dismantable joint assembly for joining a first to a second structural framework member, comprising a band clamp sized to embrace said first structural member and provided with a pair of alignable spaced-apart apertures near the ends thereof, said second framework member, being of hollow cross-section and having at least one end provided with two opposing holes, said ends of said band clamp being insertable into said second framework member between said holes, said apertures being in alignment with said holes, and a tightenable bolt unit configured for insertion through said opposing holes and said apertures, whereby on tightening of said bolt unit the ends of said band clamp are brought more closely together as result of pressure being applied by said opposing walls of said second framework member, the assembly being thereby fastened to hold the two framework members in selectable angled relationship to each other.

In a further embodiment of the present invention there is provided a structural dismantable joint assembly in combination with a tensile tie member attached at one extremity to said joint assembly, and wherein said first structural member is an asymmetrically curved roof arch and said second structural member is arranged to accept an axial compressive force, the second extremity of said tensile tie member being attached to said roof arch at a substantial distance in one direction from said assembly and the second extremity of said second structural member being attached to said roof arch at a spaced apart point in the opposite direction from said assembly.

Thus the present invention provides a joint wherein the two faces of the pipe which are slightly flattened when the joint is tightened are yet some distance apart from each other with the ends of the band clamp held tightly therebetween. It is this feature which provides greatly improved strength and rigidity particularly in torsion forces.

This may be illustrated by the following examples, where the moment of inertia of a typical tube is calculated for a tube whose opposing walls have been completely collapsed, and the same dimension tube in which, according to the invention, the walls are held some distance apart.

Completely collapsed tube
(See FIG. 5)
Moment of inertia about axis $XX$ $$\frac{bb^3}{12} = \frac{5 \times 0.3^3}{12} =$$

Tube walls only partially closed, according to the invention
(See FIG. 6)

$$I_{xx} = 2(I_{QQ} + Ad^2)$$

$$= \frac{5 \times 0.15^3}{12} (0.75 \times 1.3^3)$$

$$= 1.649 \text{ cm}^4$$

resulting in a moment of inertia improved by a factor of 146.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1. shows an end elevation of a first embodiment of a joint according to the invention;

Figure 1:
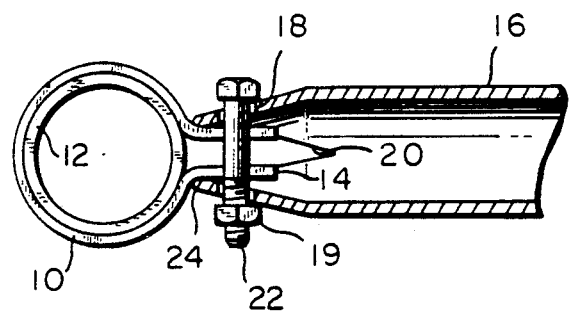
Figure 7:
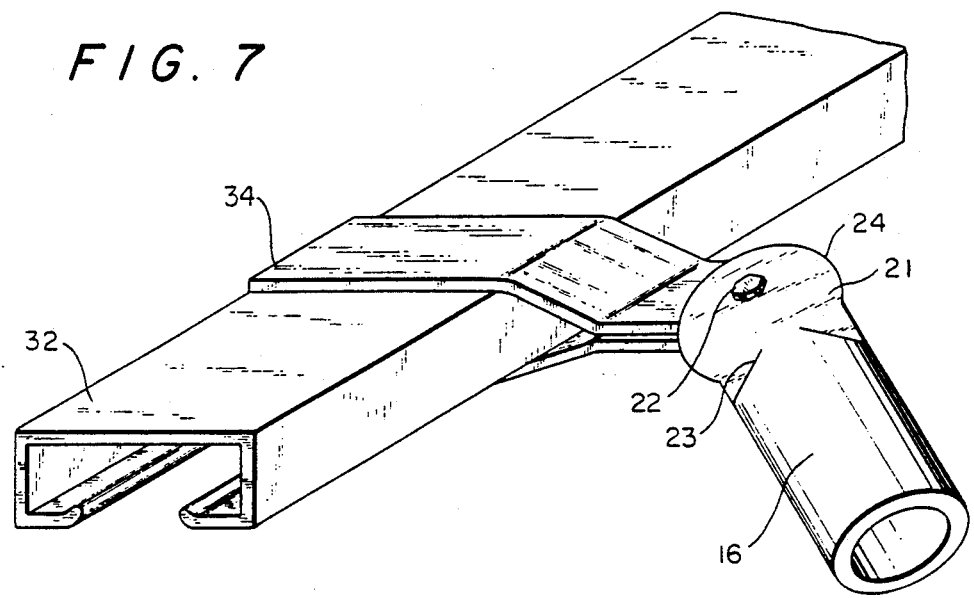
Figure 8:
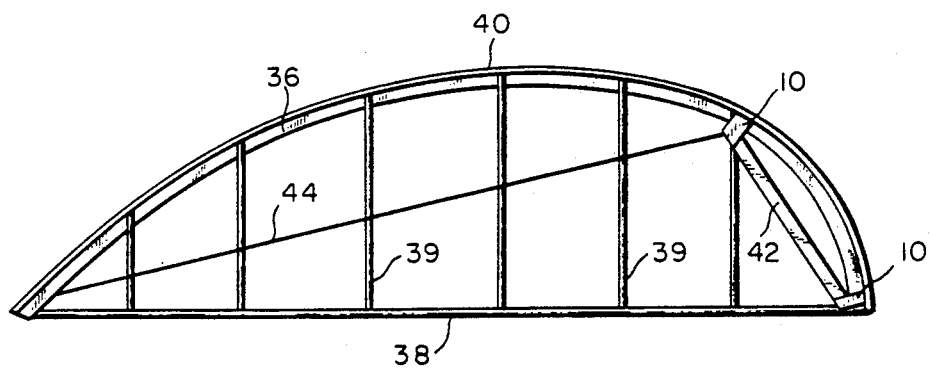

FIG. 7 is a perspective view of a joint configured for use in conjunction with a rectangular structural member: and FIG. 8 is a front elevation of a roof structure rigidized by means employing the joint of the present invention. There is shown in FIG. 1 a first embodiment of the joint, wherein a band clamp 10 is seen encircling a cylindrical body 12 which in this embodiment is a hollow body. The two ends 14 of band clamp 10 are pierced by apertures which may be holes or open-ended slots. Ends 14 are inserted into a pipe 16, the latter being pierced by a pair of opposing holes 18. Located at 90° spacing from each of the holes 18 is a cut open section 20 of pipe 16, the cut end of said pipe having the shape of an open fish mouth, formed of two flange-like projections 21 better seen in FIG. 2. A tightenable bolt is inserted through the holes 18 and through the apertures (not shown) in band ends 14, the tightenable bolt unit in this embodiment being a standard hexagon head screw 22 closed by nut 19.

Figure 2:
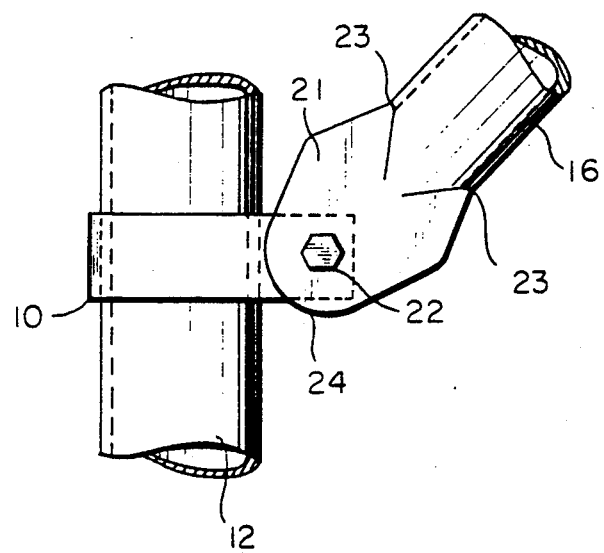
FIG. 2 is a plan view of the joint, showing assembly at an angle.

FIG. 2 shows a plan view of the joint, illustrating how pipe 16 may be attached at an angle to the cylindrical body 12. This is achieved because the end of pipe 16 is provided with two flanges 21 having rounded extremities 24, thus making possible assembly at any angle which may range from about 30° to 150°.

Figure 3:
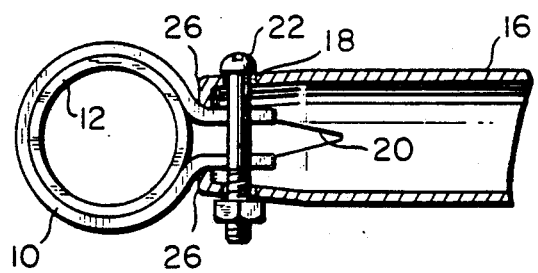
FIG. 3 is a sectional view of a second embodiment of a joint.

FIG. 3 is a sectional view of a third embodiment, wherein the pipe extremity 24 is bent inwards to form a lip 26. On assembly, the lip 26 is in forced contact with the band clamp 10, and thereby prevents excessive closure of pipe 16 under pressure of tightenable bolt 22.

Figure 4:
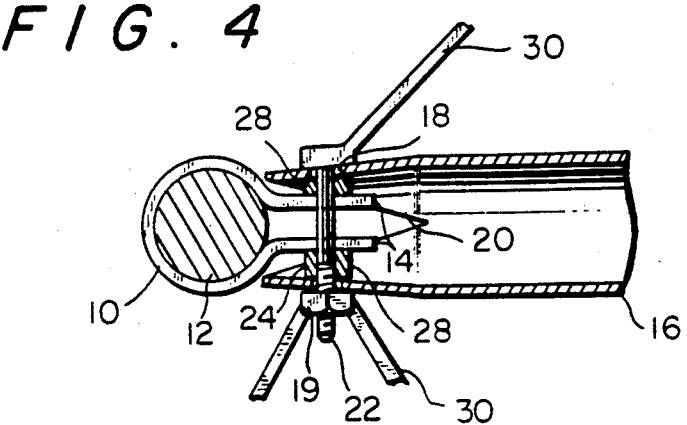
FIG. 4 is a sectional view of a third embodiment of a joint.
Figure 5:
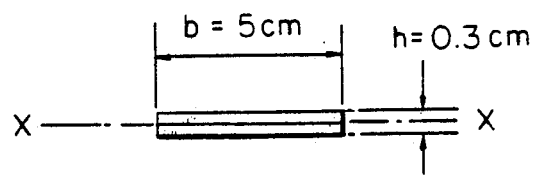
FIG. 5 is a diagram referring to calculation of the moment of inertia of a collapsed pipe.
Figure 6:
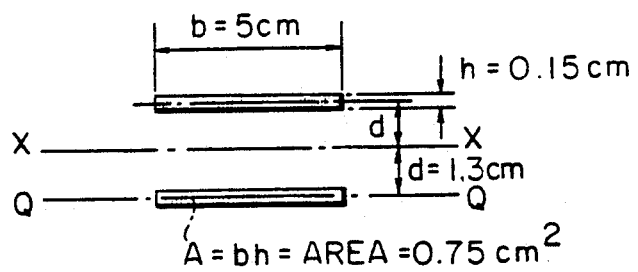
FIG. 6 is a diagram referring to a similar calculation with reference to a closed pipe.

In the embodiment shown in FIG. 4 a pair of spacer discs 28 are shown between pipe 16 and band clamp 10. Spacer discs 28 may for convenience of assembly be attached either inside the pipe 16 or outside the band clamp, or they may be unattached. Similarly to lip 26, the discs 28 prevent excessive closure of pipe 16 when bolt 22 is tightened. In this embodiment bolt 22 and its nut 19 are provided with handles 30 thus enabling fast assembly without hand tools being needed, as would be appropriate for joints which need to be assembled and dismantled many times.

In FIG. 7 there is seen a rectangular-section tube 32 of open construction embraced by a band clamp 34 shaped to suit the rectangular section tube 32. The pipe 16, flange-like projection 21, bolt 22, and rounded extremities 24 are as previously described with reference to FIG. 2.

FIG. 8 shows a roof structure such as is used over greenhouses and other similar buildings. An asymmetrically curved roof arch 36 is connected at its extremities by a main tie rod 38, vertical wires 39 connecting the tie rod 38 to the roof arch 36. Due to the large size of such roof spans as used in greenhouses, wind pressure on the plastic sheeting 40 covering the roof arch 36 causes unacceptably large deformation of the structure. However, the structure shown is stabilized by a structural member 42 arranged to accept a compressive force, in combination with a tensile tie member 44, both parts being attached to a band clamp 10 which is positioned around the roof arch 36, the joint being as described with reference to FIG. 2. The second extremity of the tie member 44 is attached to the roof arch 36 near the point of attachment to the main tie rod 38, the band clamp 10 being used at each joint, as described with reference to FIG. 2. The resulting structure has been found effective in resisting the high wind loads encountered in large greenhouses.

The present invention provides for a method of manufacturing the required shape at the end of the pipe 16, the method comprising:

a. cutting two opposed Vee slots 20 in the end of pipe 16 to form two opposed flanges 21.

b. flattening the pipe end so that opposing flanges 21 touch.

c. drilling holes 18 approximately 1.1 times as large as the diameter of bolt 22.

d. rounding the ends 24 of flanges 21.

e. applying pressure to opposing sides of pipe 16 at a point 23 adjacent the apex of said Vee slot 20 to the extent necessary to reopen the pipe end: and optionally f. for the embodiment shown in FIG. 3, form the clamping lips 26.

Steps a, b, c and d above are preferably executed simultaneously in a single machine operation.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A structural dismantable joint assembly for joining a first to a second structural framework member, comprising a band clamp sized to embrace said first structural member and provided with a pair of alignable spaced-apart apertures near the end thereof.

said second framework member, being of hollow cross-section and having at least one extremity provided with a pair of opposed cut-open sections to form two opposed flanges, said flanges being provided with opposing holes, said ends of said band clamp being insertable into said second framework member between said holes, said apertures being in alignment with said holes, and a tightenable bolt unit configured for insertion through said opposing holes and said apertures, whereby on tightening of said bolt unit the ends of said band clamp are brought more closely together as a result of pressure being applied by said opposing walls of said second framework member, the assembly being thereby fastened to hold the two framework members in selectable angled relationship to each other.

2. The structural dismantable joint assembly as claimed in claim 1, wherein said flanges are provided with rounded extremities, the center of the radius being in proximity to the axis of said opposing holes.

3. The structural dismantable joint assembly as claimed in claim 1, wherein at least one of said structural members is of rectangular cross-section.

4. The structural dismantable joint assembly as claimed in claim 1, wherein at least one of said structural members is of open cross-section.

5. A structural dismantable joint assembly for joining a first to a second structural framework member, comprising
   a band clamp sized to embrace said first structural member and provided with a pair of alignable spaced-apart apertures near the ends thereof,
   said second framework member, being of hollow cross-section and having at least one end provided with two opposing holes, said ends of said band clamp being insertable into said second framework member between said holes, said apertures being in alignment with said holes, and
   a tightenable bolt unit configured for insertion through said opposing holes and said apertures,
   whereby on tightening of said bolt unit the ends of said band clamp are brought more closely together as a result of pressure being applied by said opposing walls of said second framework member, the assembly being thereby fastened to hold the two framework members in selectable angled relationship to each other,
   wherein at least one extremity of said second structural member is configured to allow attachment to said first structural member such that the angle formed between the axis of the two structural members may have any value between about 30° to 150°.

6. A structural dismantable joint assembly for joining a first to a second structural framework member, comprising
   a band clamp sized to embrace said first structural member and provided with a pair of alignable spaced-apart apertures near the ends thereof,
   said second framework member, being of hollow cross-section and having at least one end provided with two opposing holes, said ends of said band clamp being insertable into said second framework member between said holes, said apertures being in alignment with said holes, and
   a tightenable bolt unit configured for insertion through said opposing holes and said apertures,
   whereby on tightening of said bolt unit the ends of said band clamp are brought more closely together as a result of pressure being applied by said opposing walls of said second framework member, the assembly being thereby fastened to hold the two framework members in selectable angled relationship to each other,
   further provided with at least one spacer disc, the combined thickness of two said band clamp ends and said spacer disc being less than the space between the walls of said second structural member.

7. A structural dismantable joint assembly for joining a first to a second structural framework member, comprising
   a band clamp sized to embrace said first structural member and provided with a pair of alignable spaced-apart apertures near the ends thereof,
   said second framework member, being of hollow cross-section and having at least one end provided with two opposing holes, said ends of said band clamp being insertable into said second framework member between said holes, said apertures being in alignment with said holes, and
   a tightenable bolt unit configured for insertion through said opposing holes and said apertures,
   whereby on tightening of said bolt unit the ends of said band clamp are brought more closely together as a result of pressure being applied by said opposing walls of said second framework member, the assembly being thereby fastened to hole the two framework members in selectable angled relationship to each other.
   wherein at least part of an extremity of said second structural member is bent to form a clamping lip.

8. A structural dismantable joint assembly for joining a first to a second structural framework member, comprising
   a band clamp sized to embrace said first structural member and provided with a pair of alignable spaced-apart apertures near the ends thereof,
   said second framework member, being of hollow cross-section and having at least one end provided with two opposing holes, said ends of said band clamp being insertable into said second framework member between said holes, said apertures being in alignment with said holes, and
   a tightenable bolt unit configured for insertion through said opposing holes and said apertures,
   whereby on tightening of said bolt unit the ends of said band clamp are brought more closely together as a result of pressure being applied by said opposing walls of said second framework member, the assembly being thereby fastened to hold the two framework members in selectable angled relationship to each other,
   in combination with a tensile tie member attached at one extremity to said joint assembly, and wherein said first structural member is an asymmetrically curved roof arch and said second structural member is arranged to accept an axial compressive force, the second extremity of said tensile tie member being attached to said roof arch at a substantial distance in one direction from said assembly and the second extremity of said second structural member being attached to said roof arch at a spaced apart point in the opposite direction from said assembly.

* * * * *